3,663,495
SELF-EXTINGUISHING POLYAMIDE MOULDING COMPOSITIONS

Dietrich Michael, Krefeld-Bockum, and Wilfried Kosiol, Moers, Germany, assignors to Farbenfabriken Bayer Aktiengesellschaft, Leverkusen, Germany
No Drawing. Filed Oct. 17, 1969, Ser. No. 867,380
Claims priority, application Germany, Oct. 17, 1968, P 18 03 606.1
Int. Cl. C08g 51/10, 51/58
U.S. Cl. 260—37 N          4 Claims

ABSTRACT OF THE DISCLOSURE

Self-extinguishing polyamide moulding compositions containing as flame retardant agents, melamine, a derivative of melamine, or the melamine condensation product melam in synergistic combination with organic halogen compounds.

DISCLOSURE

This invention relates to self-extinguishing polyamide moulding compositions containing, as fire-retarding agents, melamine or its derivatives and in addition organic halogen compounds.

Of the thermoplastic plastics, polyamides are substantially non-flammable. If they come into contact with a flame they burn with a blueish, slightly luminous flame. If the flame is removed, it depends upon the particular conditions prevailing whether they spontaneously cease to burn. According to the definition of self-extinguishing set out in ASTM-D-635-63, some types of polyamide count as self-extinguishing although they do not satisfy the more stringent requirements of the test according to UL Subject 94, Group II.

Fibre-reinforced, especially glass-fibre-reinforced, polyamides are flammable. Once a test specimen obtained from a moulding composition of this kind has been set alight, it will not spontaneously cease burning. This applies to any testing method.

It is known that the flammability of plastics can be reduced by the incorporation of fire-retarding substances. Unfortunately, these fire-retarding substances cannot be used with equal effect in all types of plastics; instead, each type of plastic has to have its own system. Said proposal being set forth in our copending application Ser. No. 804,262, filed Mar. 4, 1969. In that proposal melamine derivatives are substituted melamines of the formula

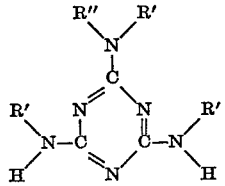

in which R'' and R' may be the same or different and represent hydrogen, methyl, ethyl, ethylene, phenyl, toluyl, or halogeno-phenyl, for example N,N',N''-triphenylmelamine or N-ethylenemelamine.

Most of the flame-retarding additives that have hitherto been proposed are halogen-containing compounds, oxygen or sulphur compounds of arsenic, antimony or bismuth or compounds of phosphorus.

The flammability of polyamides can also be reduced by additions of, for example, $Sb_2O_3$ or $Sb_2O_5$, optionally in admixture with chlorine compounds. However, to obtain an adequate effect with these compounds, they have to be added in such large quantities that the mechanical strengths of the polyamides are reduced to such an extent that they are unsuitable for practical application.

It is much more difficult to reduce the flammability of moulding compositions based on glass-fibre-reinforced polyamides. Apart from the fact that they seriously affect the mechanical properties, the conventional additives such as antimony, chlorine and phosphorus compounds do not bring about any appreciable reduction in flammability.

According to one of our own earlier proposals, a marked fire-retarding effect can be obtained in polyamides, especially glass-fibre-reinforced polyamides, by incorporating in (or mixing with) them melamine or its derivatives. In this process, the fire-retarding additives are used in quantities of from 0.5 to 25.0% by weight, based on the moulding compositions, the non-fibre-reinforced polyamide moulding compositions preferably containing from 1.5 to 7.0% by weight and the fibre-reinforced polyamide moulding compositions preferably from 5.0 to 12.5% by weight of the aforementioned compounds.

It has now been found that, when they are incorporated in polyamide moulding compositons, organic halogen compounds in conjunction with melamine or its derivatives produce a synergistic effect in regard to the self-extinguishing properties. This means that organic halogen compounds, used in quantities which, on their own, would have little or no effect, increase the tendency towards spontaneous extinguishing, when they are combined with melamine or derivatives thereof, to such an extent that smaller total quantities of additives are quite adequate. In this way, the mechanical properties of the polyamides can be kept substantially intact, or, when the quantities of additives most favourable for melamine are retained, their self-extinguishing properties can be considerably improved.

It is an object of this invention, therefore, to provide a self-extinguishing polyamide moulding composition comprising a polyamide having recurring carbonamide linkages in the polymer chain and 0.1 to 25% by weight, based on the moulding composition, of a combination of (a) a melamine compound, selected from the group consisting of melamine, a derivative of melamine and the melamine condensation product melam and (b) an organic halogen compound.

Halogen-containing polycarboxylic acids, especially those corresponding to the formula:

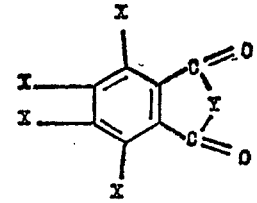

have proved to be compounds which produce the most favourable synergistic effect with melamine. In this formula, the symbols X can be the same or different and each represent hydrogen, methyl or halogen, at least two of the symbols X representing halogen and Y represents —O—, >NH or >NR, wherein R represents a lower alkyl radical.

The following are particularly preferred compounds of the formula given above: tetrachlorophthalic acid anhydride, tetrabromophthalic acid anhydride and tetrachlorophthalimide.

Melamine, its derivatives and its condensation product melam, is used as the second component. Melamine derivatives of the general formula:

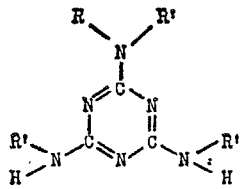

wherein R and R' represent hydrogen, methyl, ethyl, phenyl, toluyl or halogenophenyl, are particularly suitable, although melamine itself is preferred.

The melamine or its derivative may be mixed in any ratio with the organic halogen compound. If one or the other of the components is used in a large excess, the synergistic effect naturally suffers and the properties of the mixture tend to approximate to those of the predominating individual component. It has been found that the melamine compound should be employed as the main constituent in the most favourable formulations, the weight ratio of melamine or its derivative to the organic halogen compound being in the range from 1:1 to 15:1.

The self-extinguishing polyamide mouldings according to the invention contain a total of from 0.1 to 25% by weight of flame-retarding additives, based on the moulding composition, the non-fibre-reinforced polyamide moulding compositions preferably containing from 0.5 to 5.0% by weight and the fibre-reinforced moulding compositions preferably from 2.5 to 10.0% by weight of the aforementioned mixtures. It is possible in this way to obtain a level of non-flammability or tendency towards self-extinction that is high enough to meet the requirements of ASTM specifications D–635–63 and UL Subject 94, Group II. The mouldings obtained count as self-extinguishing both according to ASTM–D–635–63 and according to UL Subject 94, Group II.

Table II in the following examples clearly shows, through the "afterburn times" quoted in it, the improvement in the tendency toward spontaneous extinction obtained by employing the mixtures according to the invention, and the possibility of managing with smaller quantities of mixture than with melamine or its derivatives alone, i.e. the synergistic effect.

In the context of this invention, polyamide moulding compositions are moulding compositions in any form for example finely divided moulding compositions, bead-form moulding compositions, cylindrical granulates or irregular fragments of the kind obtained in grinding. The particles advantageously have diameters of from 0.5 to 5 mm. and lengths of from 1 to 10 mm. In addition to the additives used according to the invention, the moulding compositions may also contain other conventional components such as fillers, dyes and pigments, lubricants, plasticisers, antistatic agents and stabilisers or compounds which promote foaming.

Polyamides suitable for use in the preparation of the moulding compositions according to the invention include any polyamides of the kind obtained by polymerising lactams or by polycondensing aminocarboxylic acids or the salts of diamines and dicarboxylic acids or by polycondensing diamines with dicarboxylic acid derivatives. It is preferred to use polyamides with molecular weights in the range from 5000 to 60,000; which corresponds to a relative solution viscosity $\eta_{rel.}$ (as measured on a solution of 1 g. of polymer in 100 ml. of m-cresol at 20° C. in an Ubbelohde-Viscosimeter) of from 1.25 to 7.0. It has proved to be particularly suitable to use melamine, its derivatives and condensation products in conjunction with organic halogen compounds for fibre-reinforced polyamide moulding compositions, in which compositions it has hitherto been impossible to obtain a fire-retarding effect, especially polyamide moulding compositions reinforced with glass fibres. The fibre-reinforced polyamide moulding compositions may contain as fibres, for example, fibres of cotton, sisal, asbestos, synthetic fibres, fibres of inorganic material and, in particular, glass fibres. The fibres may contribute up to 80% by weight of the polyamide moulding compositions.

The test according to ASTM–D–635–63 is carried out as follows:

A test specimen measuring 127 mm. x 12.7 mm. x 2.54 mm., preferably 127 mm. x 12.7 mm. x 6.35 mm. is clamped in a frame in such a way that its longitudinal axis is horizontal and its transverse axis inclined at an angle of 45°, and its free end is set alight with a Bunsen flame. The Bunsen burner has a tube diameter of 10 mm. and the blue flame burns to a height of about 25 mm. The tip of the flame is kept in contact with the lower end of the test specimen for a period of 30 seconds. If the test specimen ceases to burn after the flame has been removed, it must be brought into contact with the flame for another 30 seconds immediately after going out. If the flame goes out before reaching a reference mark located 101.6 mm. from the ignited end of the rod or bar, the material in question is regarded as self-extinguishing.

The test according to UL Subject 94, Group II is carried out as follows: (UL-Test: Underwriters' Laboratory Incorporation, a not-for-profit organisation sponsored by the American Insurance Association, Testing for Public Safety, 207 E. Ohio St., Chicago, Ill., 60611, U.S.A. Specifications and results of tests published in Bulletin of Research, in this case specification dated Sept. 12, 1959, Subject 94: Burning Test of Plastics).

Test specimens measuring 153.4 mm. x 12.7 mm. x 6.35 mm. and 153.4 mm. x 12.7 mm. x 1.59 mm. are tested fresh from injection and after storage for 7 days at 70° C. To this end, the specimens are clamped vertically in a frame and brought into contact at their lower end with a 19 mm. tall blue Bunsen flame without a cone for a period of 10 seconds. If the period for which the specimen continues to burn following removal of the burner flame is longer than 30 seconds, the specimen is brought into contact with the flame for another 10 seconds.

If the afterburn period is on average less than 25 seconds per ignition, and if that portion of the specimen projecting from the clamp is not charred over its entire length, the material is regarded as self-extinguishing according to UL Subject 94, Group II.

The parts in the following examples which are to further illustrate the invention without limiting it, are parts by weight, and the percentages are percentages by weight.

The relative viscosities $\eta_{rel.}$ as given in the examples are measured on a solution of 1 g. of polyamide in 100 ml. of m-cresol at 20° C.

Example I

In addition to 27.3 parts of glass fibres, 8.18 parts of melamine and 0.82 part of tetrachlorophthalic acid anhydride (weight ratio of melamine to tetrachlorophthalic acid anhydride=10:1) are worked into 63.7 parts of polyamide-6 having a relative viscosity $\eta_{rel.}$=3.1 (as measured on a solution of 1 g. of polyamide in 100 ml. of m-cresol at 20° C.) in an extruder.

After cooling, the extruded strand is granulated, dried and injection-moulded into test specimens measuring (1)     127 x 12.7 x 6.35 (mm.)
(2)     127 x 12.7 x 1.59 (mm.)

The test specimens thus obtained were tested to assess their flammability in accordance with ASTM specification D–635–63 and UL Subject 94, Group II. The material counts as self-extinguishing according both to ASTM–D–635–63 and UL Subject 94, Group II.

To demonstrate the synergistic effect of the mixtures according to the invention, the afterburn times of the moulding composition containing the additive used according to the invention are compared with those of moulding compositions from comparison tests which, on the one hand, contain only melamine and, on the other hand, only the synergistic combinations incorporated in the moulding composition.

The afterburn time is that period for which the flame on the test specimen continues burning following removal of the burner flame. This time is a measure of the effectiveness of the additive. Untreated moulding compositions burn away following removal from the flame.

This period was determined together with the test acocrding to ASTM–D–635–63. The test specimens are initially kept in contact with the flame for 30 seconds and, if they go out, for another 30 seconds. The periods elapsing between removal of the burner flame and extinction are used to determine the afterburn time.

The results set out in Table I were obtained.

TABLE I

| Additive | Quantity in which it is added (percent by weight) | Average afterburn time (in seconds) |
| --- | --- | --- |
| Melamine | 8.18 | 5.5 |
| Tetrachlorophthalic acid anhydride | 0.82 | (¹) |
| Melamine plus tetrachlorophthalic acid anhydride (weight ratio 10:1) | 8.18+0.82 | 2.2 |

¹ Not extinguished.

These results and the results obtained from further examples are set out in Table II.

Example II 66.1 parts of polyamide-6 having a relative solution viscosity $\eta_{rel.}$ of 3.1 (as measured on a solution of 1 g. of polyamide in 100 ml. of m-cresol at 20° C.) and 28.4 parts of glass fibres are processed with 5 parts of melamine and 0.5 part of tetrachlorophthalic acid anhydride (weight ratio of melamine to tetrachlorophthalic acid anhydride=10:1) as described in Example I and then injection-moulded and tested.

The material counts as self-extinguishing according to ASTM–D–635–63 and UL Subject 94, Group II. The synergistic effect is apparent from the afterburn times set out in Table II.

Example III 65.8 parts of polyamide-6 having a relative solution viscosity of $\eta_{rel.}=3.1$ and 28.2 parts of glass fibres are processed together with 5.33 parts of melamine and 0.67 part of tetrabromophthalic acid anhydride (weight ratio of melamine to tetrabromophthalic acid anhydride=8:1) as described in Example I, and then injection-moulded and tested.

The material counts as self-extinguishing according to ASTM–D–635–63 and UL Subject 94, Group II. The synergistic effect is apparent from the afterburn times set out in Table II.

Example IV 65.8 parts of polyamide-6 having a relative solution viscosity $\eta_{rel.}=3.1$ and 28.0 parts of glass fibres are processed together wtih 5.90 parts of melamine and 0.6 part of tetrachlorophthalimide (weight ratio of melamine: tetrachlorophthalimide=10:1) as described in Example I and then injection-moulded and tested.

The material counts as self-extinguishing according to ASTM–D–635–63 and UL Subject 94, Group II. The synergistic effect is apparent from the afterburn times set out in Table II.

Example V

Instead of glass fibres, 18.2 parts of asbestos fibres (Krokydolith), and 8.0 parts of melamine and 1.0 part of tetrabromophthalic acid anhydride are worked into 72.8 parts of polyamide-6 having a relative solution viscosity $\eta_{rel.}=3.1$ as described in Example I and then injection moulded and tested.

The material counts as self-extinguishing according both to ASTM–D–635–63 and to UL Subject 94, Group II. The synergistic effect is apparent from the afterburn times set out in Table II.

Example VI 27.9 parts of glass fibres, 4.5 parts of melamine and 0.45 part of tetrabromophthalic acid anhydride are worked into 67.2 parts of polyamide-6,6 having a relative solution viscosity $\eta_{rel.}=2.93$ (as measured on a solution of 1 g. of polyamide in 100 ml. of m-cresol at 20° C.) in an extruder as described in Example I, followed by injection and testing.

The material counts as self-extinguishing according both to ASTM–D–635–63 and to UL Subject 94, Group II. The synergistic effect is apparent from the afterburn times set out in Table II.

Example VII

In contrast to the preceding examples, no fibers are used. 1.78 parts of melamine and 0.22 part of tetrabromophthalic acid anhydride are worked into 98.0 parts of polyamide-6 having a relative solution viscosity $\eta_{rel.}=3.1$ (as measured in m-cresol at 20° C.) in an extruder, followed by injection moulding and testing as in Example I.

The material counts as self-extinguishing according to ASTM–D–635–63 and UL Subject 94, Group II. The synergistic effect is apparent from the afterburn times set out in Table II.

TABLE II

| Example | Additive | Quantity in which additive is used (percent by weight) | Average afterburn time (in seconds) |
| --- | --- | --- | --- |
| I | Melamine | 8.18 | 5.5 |
|   | Tetrachlorophthalic acid anhydride. | 0.82 | (¹) |
|   | Melamine plus tetrachlorophthalic acid anhydride (ratio 10:1). | 8.18+0.82 | 2.2 |
| II | Melamine | 5.0 | 85 |
|   | Tetrachlorophthalic acid anhydride. | 0.5 | (¹) |
|   | Melamine plus tetrachlorophthalic anhydride (10:1). | 5.0+0.5 | 8.1 |
| III | Melamine | 5.33 | 75 |
|   | Tetrabromophthalic acid anhydride. | 0.67 | (¹) |
|   | Melamine plus tetrabromophthalic acid anhydride (ratio 8:1). | 5.33+0.67 | 6.9 |
| IV | Melamine | 5.9 | 55 |
|   | Tetrachlorophthalimide | 0.6 | 90 |
|   | Melamine plus tetrachlorophthalimide (ratio 10:1). | 5.9+0.6 | 2.9 |
| V | Melamine | 8.0 | 13.2 |
|   | Tetrabromophthalic acid anhydrde. | 1.0 | (¹) |
|   | Melamine plus tetrabromophthalic acid anhydride (ratio 8:1). | 8.0+1.0 | 5.2 |
| VI | Melamine | 4.5 | 45 |
|   | Tetrabromophthalic acid anhydride. | 0.45 | (¹) |
|   | Melamine plus tetrabromophthalic acid anhydride (ratio 10:1). | 4.5+0.45 | 7.5 |
| VII | Melamine | 1.78 | 18 |
|   | Tetrabromophthalic acid anhydride. | 0.22 | (¹) |
|   | Melamine plus tetrabromophthalic acid anhydride (ratio 8:1). | 1.78+0.22 | 7.5 |

¹ Not extinguished.

What we claim is:

1. A self-extinguishing polyamide moulding composition comprising a polyamide having recurring carbonamide linkages in the polymer chain and 0.1 to 25% by weight, based on the moulding composition, of a combination of (a) melamine or melam; and (b) an organic halogen compound corresponding to the general formula

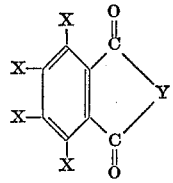

wherein each X represents hydrogen, methyl or halogen, at least two of the symbols X representing halogen; and Y represents —O—, >NH or >NR, wherein R represents a lower alkyl radical; wherein the weight ratio of said melamine or melam to said organic halogen compound is in the range of 1:1 to 15:1.

2. A process for the production of self-extinguishing polyamide moulding composition which comprises adding 0.1 to 25% by weight of a combination of
(a) melamine or melam and
(b) an organic halogen compound corresponding to the general formula

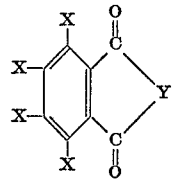

wherein each X represents hydrogen, methyl or halogen, at least two of the symbols X representing halogen; and Y represents —O—, >NH or >NR, wherein R represents a lower alkyl radical; to the melt of a polyamide wherein the weight ratio of said melamine or melam to said organic halogen compound is in the range of 1:1 to 15:1, cooling the melt thus obtained and granulating.

3. The self-extinguishing polyamide moulding composition of claim 1, said polyamide moulding composition being a fibre-reinforced polyamide moulding composition.

4. The self-extinguishing polyamide moulding composition of claim 3, said fibre-reinforced polyamide moulding composition being a glass-fibre-reinforced polyamide moulding composition.

References Cited

UNITED STATES PATENTS

| | | | |
|---|---|---|---|
| 3,270,016 | 8/1966 | Duennenberger | 260—248 |
| 3,379,676 | 4/1968 | Ashton et al. | 260—45.8 |
| 3,418,267 | 12/1968 | Busse | 260—33.8 |
| 3,419,517 | 12/1968 | Hedrick | 260—37 |
| 3,084,135 | 4/1963 | Scullin | 260—41 |
| 3,496,136 | 2/1970 | Susi et al. | 260—45.8 |

FOREIGN PATENTS

| | | |
|---|---|---|
| 1,191,569 | 4/1968 | Germany. |
| 991,159 | 5/1965 | Great Britain. |

MORRIS LIEBMAN, Primary Examiner

R. ZAITLEN, Assistant Examiner

U.S. Cl. X.R.

106—15 FP; 260—45.8 N